J. HEWITT.

Smoothing and Fluting Irons.

No. 5,437. Reissued June 3, 1873.

*Witnesses:*
Edwm James
K. V. Gordon

*Inventor:*
John Hewitt
per J. E. P. Holmead
Attorney.

AM. PHOTO-LITHOGRAPHIC CO. N.Y. (OSBORNE'S PROCESS)

UNITED STATES PATENT OFFICE.

JOHN HEWITT, OF PITTSBURG, PENNSYLVANIA.

IMPROVEMENT IN SMOOTHING AND FLUTING IRONS.

Specification forming part of Letters Patent No. 135,335, dated January 28, 1873; reissue No. 5,357, dated April 15, 1873; reissue No. 5,437, dated June 3, 1873; application filed May 27, 1873.

*To all whom it may concern:*

Be it known that I, JOHN HEWITT, of Pittsburg, in the county of Allegheny and State of Pennsylvania, did invent certain new and useful Improvements in Smoothing and Fluting Irons and Holders, on which Letters Patent of the United States were granted, bearing date January 28, 1873, and numbered 135,335, and reissued in two divisions April 15, 1873; and that the following is a full, clear, and exact description of the invention embraced in Division A, reference being had to the accompanying drawing and the letters of reference marked thereon making part of this specification, in which—

Figure 1:
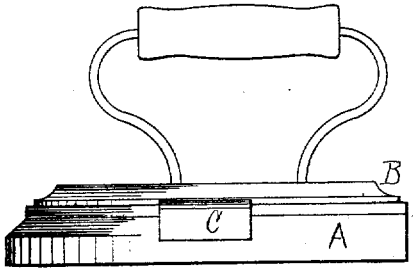
Figure 2:
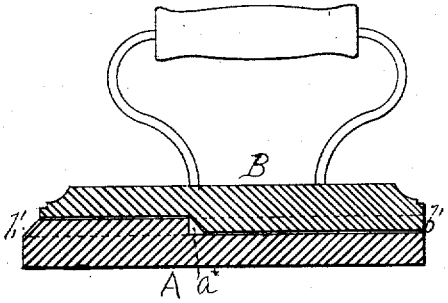
Figure 3:
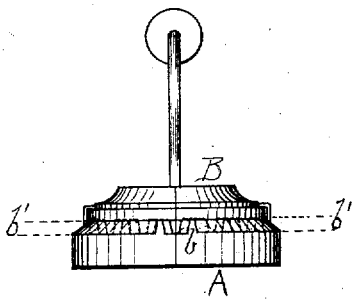
Figure 4:
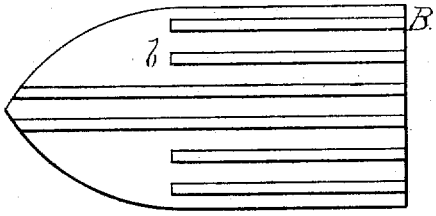
Figure 5:
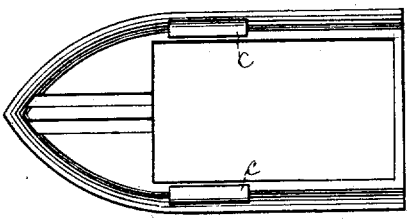
Figure 6:
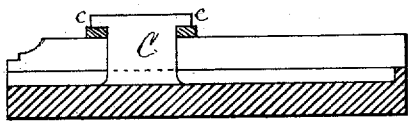

Figure 1 is a side view. Fig. 2 is a longitudinal sectional view. Fig. 3 is an end view of Figs. 1 and 2. Fig. 4 is a bottom view of the handle-plate. Fig. 5 is a top view of the lower plate. Fig. 6 is a longitudinal sectional view of the lower plate, showing another style of fastening.

The nature of my invention consists in constructing an iron in such manner as to provide two independent ironing-surfaces, each susceptible of an unlimited ironing movement on and over a horizontal plane, one of the surfaces being finished for use as a sad-iron and the other corrugated for use as a fluting-iron. These corrugations are to be so formed—and herein lies the essence of the invention so far as relates to the fluting device—that the rising lines or ribs shall, throughout their entire length, extend or project below the plane of the surface of the plate, so that when the fluting-face is used in connection with any suitable corrugated base-board the ribs of each shall enter and be inclosed in the recesses or grooves of the other, so as to allow of a free and unlimited forward and backward ironing movement of the fluting-iron over the base-board, and which permits of what has never before been accomplished with a fluting-iron that was connected with or formed part of a sad-iron—that is, the entire corrugated surface of the fluting-iron, as well as that of the base-board, being used in the process of ironing the material that it is desired to flute.

I will now proceed to describe one mode of constructing and operating my invention, and which is as follows: The iron is of the ordinary form, and is constructed of any suitable material in two distinct and independent sections, the sad-iron plate A and fluting section B. These are connected by any suitable attachment, C, so as to form a complete sad-iron, care being taken that the attachment is such as to allow of the ready detachment of the fluting section, as in fluting it is to be used entirely independent of the sad-iron plate A, which, of course, renders any such connection as a hinge-joint or other such attachment wholly impracticable; and, besides, a hinge or other such attachment which would require a tongue or lip to project from the under face of the section B would defeat entirely the chief object my invention is designed to accomplish, which is to utilize the entire corrugated faces of the upper section with the corrugated face of an independent base-board as to iron the fluting in contradistinction to pressing, as is the general practice. Of course, any projection on the under face of the section B, for attachment or otherwise, would interrupt the forward and backward movement always necessary in all ironing processes. In the drawing are shown two methods of attachment, one illustrated at C, Fig. 1, and the other at C, Fig. 6. The attachment in Fig. 1 simply consists in providing, by any suitable means, the plate A with a clasp having clamping-jaws *c c*, under which the section B slides, and by which it is held in position and direct contact with the sad-iron plate A. The other attachment consists in forming the sad-iron plate A with a tongue, C, which passes up through a slot in one of the grooves of the section B, and which slot passes over the head of the tongue, and the plates are then fastened by any suitable catch passing under the shoulder *c c* of the tongue. This slot in the section B offers no obstruction to the ironing process, as hereinbefore referred to. The lower face of the section B has corrugations throughout its entire length, as clearly shown in Fig. 4. The ridges or ribs *b b*, which form the corrugations on the face B, project or extend throughout their entire surface beyond the highest section of the plane of the plate, as shown by dotted lines *b′ b′* in Figs. 2 and 3, and which permits not only of the ribs or ridges *b b* being inserted into the groove of the base-board throughout their entire width and length, but allows of their utmost freedom of movement therein. The corrugations of the section B and base-board thus meeting, the ribs of the one resting in the recesses of the other, as shown in Fig. 3, allows of an unobstructed ironing motion being given to the upper part, and in consequence of the fact that the part B rests in and works over the base-board in a level or flat position, precisely as the ordinary smoothing-iron rests and works over the ironing-board, the entire surfaces of the corrugated faces of both section B and the base-board are used in ironing the flutes and in imparting the desired gloss thereto. The upper face of the sad-iron plate A is recessed, as shown at *a*, Fig. 2, so as to permit the plates A B to meet and be properly connected for use as a sad-iron. This recess *a* also serves to inclose or incase the ribs *b b* when not required for use as an ironing-crimper for a fluting device, and also when the ironing-crimper is being used serves as a heater for the same. The sad-iron being left on the stove, as the section B becomes cool it is reheated simply by placing it on the sad-iron plate, the ribs *b b* resting in the recess *a* thereof, and thus the part B is heated and reheated without the risk of its ribs *b b* ever being injured or defaced by contact with the stove or other heater.

The great advantage of having an independent plate to use in connection with the corrugated section B in fluting is that, not being a permanent feature of the sad-iron during the process of ironing, it does not become unduly heated; so the instant you cease work with the smoothing-iron the fluting mechanism is ready for work, no cooling time for any feature of the same being required. When the plate—that is, the base-plate—is heated there is always more or less danger of it burning the material, as the starched fabric, when moistened, being more or less gluey, has the tendency, when spread over the ribs, to stick, and consequently scorch or tear.

What I claim as new, and desire to secure by Letters Patent of the United States, is—

An iron with a coniform point, having two ironing-surfaces, one finished as a sad and the other as a fluting iron, the ribs or ridges of the latter, throughout their entire length, projecting below the highest surface of the plane of its plate, substantially as described.

In testimony whereof I have signed my name to this specification before two subscribing witnesses.

JOHN HEWITT.

Witnesses:
EDWIN JAMES,
JOS. T. K. PLANT.